June 14, 1955 F. W. MEREDITH 2,710,729
CONTROL SYSTEMS RESPONSIVE TO A RATE OF CHANGE OF CONDITION
Filed Aug. 20, 1948
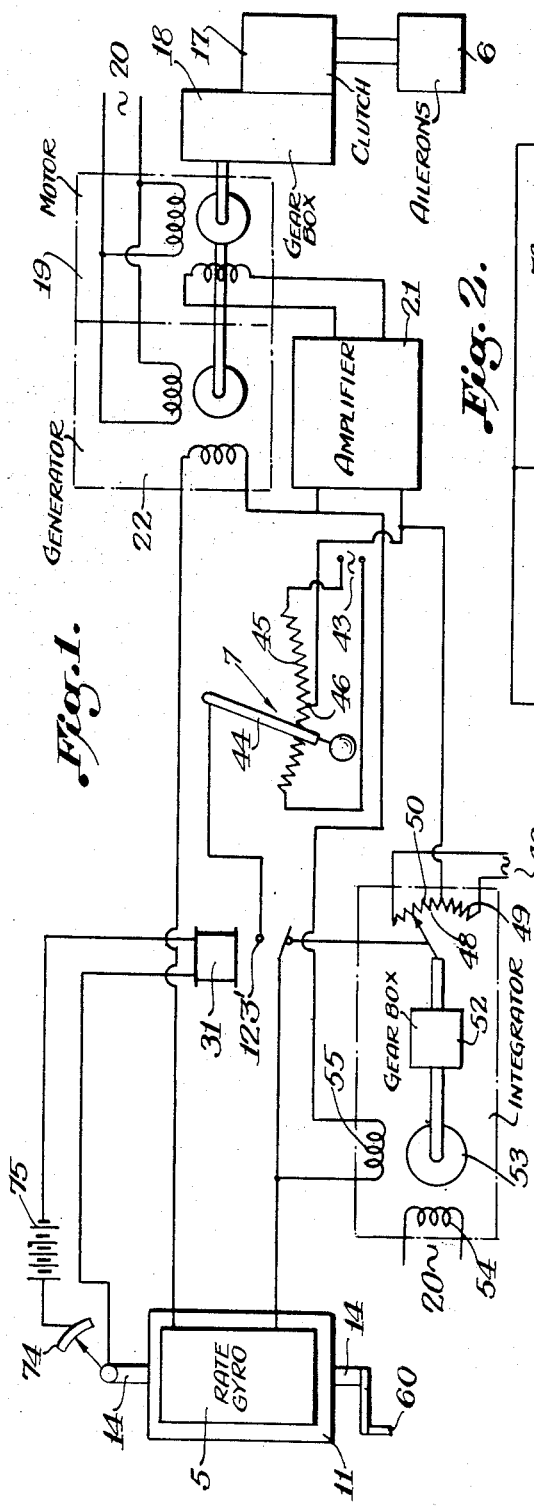
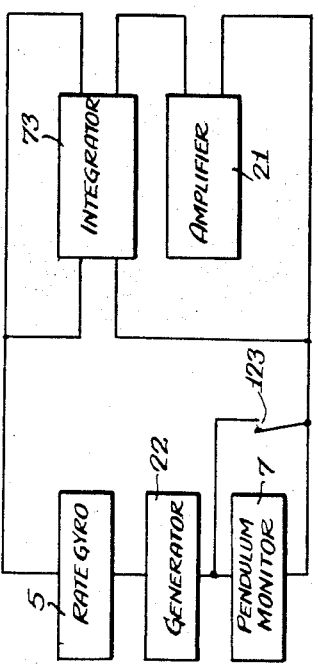
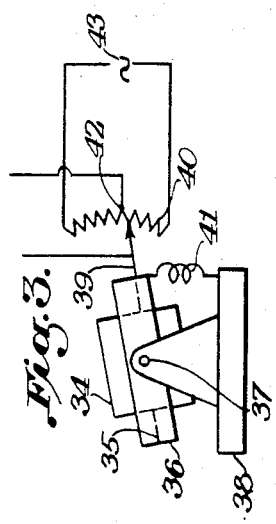
INVENTOR
FREDERICK WILLIAM MEREDITH.
BY
ATTORNEYS

United States Patent Office 2,710,729
Patented June 14, 1955

2,710,729

CONTROL SYSTEMS RESPONSIVE TO A RATE OF CHANGE OF CONDITION

Frederick William Meredith, London, England, assignor to S. Smith & Sons (England) Limited, London, England, a British company Application August 20, 1948, Serial No. 45,226

Claims priority, application Great Britain August 25, 1947

11 Claims. (Cl. 244—77)

This invention relates to follow up control systems in which the condition of an object is controlled to follow the changing condition of a controlling object. Probably the commonest form of such a system is a position control system in which it is desired to make a controlled member follow the movements of a controlling member and the invention will therefore be considered mainly from this aspect, although it should be appreciated that it also is applicable to other control systems, for example those in which the condition is the temperature or velocity of the object.

In a position control system it is usual to measure the relative displacement or misalignment of the two members and to control the controlled member to bring this misalignment to a desired value, usually zero. It may happen however that it is not possible or convenient to measure the displacement of one or both members. We provide an alternative control system in which signals proportional to the rate of change of condition of the controlled and controlling objects are obtained and the movement of the controlled object is controlled by a motor energised in accordance with the difference between these signals and the motor operates to maintain this difference substantially at zero. However circumstances may arise in which the proportionality between the changes of condition of the controlled and controlling objects will not be maintained by this arrangement—for instance if the motor is controlled through an amplifier, this amplifier may be intermittently saturated, or the motor may have to supply a standing torque, i. e. it may have to apply a torque while remaining stationary.

It is the object of this invention to provide an automatic control system of the type in which signals proportional to the rate of change of condition of the controlled and controlling objects are utilised and which does not suffer from the defect considered above, that is, it is to provide an automatic control system of this kind in which the proportionality of the conditions of the controlled and controlling objects is maintained despite amplifier saturation or standing motor torque.

According to the present invention a follow up control system comprises means for exercising a control on the controlled object in accordance with the integral of the difference between the rates of change of the condition of the controlling object and the controlled object.

The invention also includes a follow up control system of the type described comprising means for generating signals proportional to the rates of change of condition of the controlling object and the controlled object respectively, means for generating a signal proportional to the integral of the difference of the two rate of change signals and means for exerting a control on the controlled object in accordance with the integral signal.

The controlled object may also be controlled in accordance with the difference of the rate of change signals.

There may also be provided means for generating a signal in proportion to the change of condition of the controlling object, said signal being added to and integrated together with the difference of the rate of change signals to produce the controlling signal.

The control may conveniently be exercised through an electro servo-motor and the signals may be electrical signals applied thereto. The signals are preferably applied to the motor through an amplifier.

In one arrangement in accordance with the invention the conditions are the positions of controlling and controlled members respectively. In such an arrangement the members may be mounted on a moving craft and the positions may be the angular position of the controlling member in space and the position of the controlled member relative to the craft. Furthermore the controlled member may be the control surface of an aircraft.

Constructions in accordance with the invention will now be described as modifications of the automatic control system for an aircraft described in U. S. Letters Patent No. 2,607,550, reference being made to the accompanying drawings in which:

Figure 1 illustrates diagrammatically the layout of an automatic control system for controlling an aircraft about the roll axis.

Figure 2 illustrates a modification of the system shown in Figure 1,

Figure 3 illustrates in further detail the rate-of-turn instruments shown in Figures 1 and 2.

Referring to Figure 1, the aircraft is stabilised about the roll axis by means of the rate-of-roll gyroscope 5. This gyroscope and its associated circuits will be described in greater detail with reference to Figure 3 later in this specification and it will suffice for an understanding of Figure 1 to state that it gives an electrical output in accordance with the detected rate of turn, which output is an A. C. signal of the same frequency as that of a source 20 but in quadrature therewith leading or lagging thereon as the turn is in one direction or the other.

The rate-of-turn gyroscope 5 is mounted on a platform 11 pivoted in the aircraft about the roll axis 14. The platform 11 can be rotated relatively to the aircraft about the roll axis 14 by means of a handle 60 coupled to the roll axis 14. The platform 11 can thus be moved to any desired position in roll relative to the aircraft and, during straight flight conditions, the platform is centrally positioned about the roll axis.

The ailerons are coupled through a clutch 17 and gear box 18 to an electric hysteresis motor 19 of the kind described in British patent specifications Nos. 576,248 and 576,249. Motor 19 is wound for two-phase operation, one phase (a reference phase) being coupled to an A. C. source 20, and the other phase, the control phase, being coupled to the output of an amplifier 21. Motor 19 is coupled to a hysteresis generator 22 of the kind described in British patent specification No. 576,351. The generator is also wound for two-phase operation, one phase being connected to the source 20 so that an output proportional to the speed of the generator and therefore of the motor is generated in the other phase.

The output from the rate-of-roll gyroscope 5 is applied in series with the output from generator 22 and the output from either a cross-level monitor or pendulum 7 or an integrating circuit to the input of bank amplifier 21. The cross-level monitor 7 will be described in greater detail hereinafter and it will suffice for an understanding of Figure 1 to state that, during straight flight, a voltage is produced across its electrical output terminals proportional to the deviation of the aircraft from the horizontal in roll and is of the same frequency and phase as the output signal of the rate of roll gyroscope.

The integrator comprises a centre-tapped potentiometer 49, the slider 48 of which is driven by the motor 53, through gear box 52. The input to the integrator is applied to the stator winding 55 (in the case of Figure 1).

This input consists of the outputs from gyroscope 5 and generator 22 in series while the output, which is a voltage in phase with the output from gyroscope 5 appears between centre tap 50 and slider 48 of potentiometer 49. The slider arm 48 is connected to one pole of the double-poled switch 123 and the centre point 50 of potentiometer resistance 49 is connected to the input of the amplifier. The other pole of switch 123 is connected to cross level monitor 7 so that in one position of switch 123 the control circuit is completed through cross-level monitor 7 and in the other position is completed through slider arm 48 and potentiometer resistance 49. Switch 123 is operated by relay 31 which is in turn actuated on rotation of the platform 11 from the position in which it is level in the aircraft. On actuation of relay 31, the switch 123 is moved into the position shown in full line, i. e. so that the roll control circuit is completed through potentiometer resistance 49. An A. C. source 143 having an output of the same frequency as that of source 20 but in quadrature therewith is connected across the ends of potentiometer resistance 49.

The operation of the circuit is as follows:

Considering first the roll control system during level flight of the aircraft, it will be seen that the algebraic sum of three voltages is applied to the input of the amplifier 21 of the aileron control. These voltages are proportional respectively to the rate of roll as measured by the rate-of-roll gyroscope 5, the deviation in roll of the aircraft from the horizontal as measured by the pendulum or cross-level monitor 7 and the speed of the motor 19. The pendulum 7 is purely a monitor, that is it gives a comparatively weak signal compared with those derived from the rate-of-roll gyroscope 5 and the generator 22, and its effect on the operation of the motor 19 during a disturbance may be neglected. The motor 19 operates to reduce the input to the amplifier, i. e. the output from generator 22 is in antiphase with that from rate-of-roll gyroscope 5, and since the gain of the amplifier 21 is made very large it will reduce this substantially to nothing. That is to say during a disturbance the motor will run at such a speed that the output of the generator 22 is substantially equal but opposite to the output of the rate-of-turn device 5, or in other words the motor 19 and therefore the ailerons 6 will be operated at a speed proportional to the rate of roll. This will have the effect of very rapidly stabilising any disturbance in roll. If after the disturbance is stabilised the aircraft is not level in roll, the electrical signal from the pendulum 7 will unbalance the system until the aircraft is level.

Change of course is effected by banked turns. To achieve this the platform 11 is rotated by handle 60 and the relay 31 deenergised by opening switch contacts 74 which are open whenever platform 11 is not substantially level in the aircraft, thereby breaking the circuit between battery 75 and relay 11 to take cross-level monitor 7 out of circuit and, to put the integrating device into circuit. When the platform 11 is rotated in roll the aircraft rotates about its roll axis at the same rate but in the opposite direction so that the absolute rate of turn to which the rate-of-roll gyroscope 5 is subjected is zero. The platform 11 is thus maintained horizontal in space and the aircraft turns through an equal but opposite angle to that to which the platform 11 is turned relative to the aircraft. When the aircraft is rotated through the desired angle of bank, rotation of platform 11 is stopped, and the aircraft turns in azimuth at the rate appropriate to its angle of bank and forward air speed.

When the aircraft reaches the desired new course the platform 11 is returned to its original position and the relay 31 is energised. The bank is thus taken off and turning ceases.

During a turn in azimuth of the aircraft, the cross-level monitor 7, which is pendulous, is subject to acceleration forces and is cut out by switch 123 during the turn. Consequently during a turn it is possible for the platform 11 to depart from the level in roll. Normal turns to change course are usually of such short duration that no serious departure of the platform from the level position will take place during the turn. It may be, however, that an aircraft will have to circle an airfield for some time before being given permission to land, and such prolonged turns can give rise to serious discrepancies in the position of the platform, and, owing to possible intermittent asymmetric saturation of the servo amplifier due, for example, to the inertia of the servo-motor or an asymmetric hinge movement of the ailerons i. e. movements of the servo-motor in equal opposite directions from the position corresponding to the amidships position of the ailerons may not result in equal and opposite movements of the ailerons there may be serious misalignment of the ailerons and platform, i. e. even when the ailerons are amidships with respect to the aircraft the platform may not be level in space. To overcome this difficulty the integrating circuit previously mentioned is provided. The signals from rate-of-roll gyroscope 5 and roll generator 22 are applied to the input of the integrator. The output from the integrator is proportional to the integral with respect to time of the input signal. During a turn the output from the potentiometer is in series with the roll control circuit so that during a turn the motor 19 is controlled by the rate of roll signal, the output from the generator 22 and the integral signal. If conditions arise which tend to cause discrepancies in the position of the platform, the signals from the devices 5 and 22 will not be equal and an integral signal will appear across the output of the integrator. This output signal will cause the system to actuate to restore the platform 11 to a level position since the platform 11 is maintained in alignment with the ailerons which, in the steady state, must be amidships.

In place of the integrating motor 51 and potentiometer, a thermionic valve integrating circuit of any convenient form may be used.

Figure 2 shows schematically the manner in which certain components of the roll control circuit may be rearranged. The components shown in Figure 1 which are not also shown in Figure 2 are arranged in the same manner as in the arrangement of Figure 1, that is the rate-of-roll gyroscope 5 is located on the platform 11 and the output from the roll amplifier 21 is applied to the aileron servo motor 19. The aileron servo feed-back generator and pendulous cross-level monitor are respectively 22 and 7. In the arrangement of Figure 2 the outputs from rate gyroscope 5, feed-back generator 22 and pendulum 7 are connected in series to the input terminals of an integrating device 73 comprising a motor, potentiometer etc. as shown in Figure 1 and described with reference to that figure. Contacts 23 are provided in parallel with the output terminals of pendulum 7 and are closed by a relay (arranged in a similar manner to relay 31 of Figure 1) when the platform 11 is rotated from the level position in the aircraft. The output from the integrating device 73 is always applied to the roll amplifier 21 whether or not the aircraft is banked (in contradistinction to the arrangement of Figure 1) in series with the output from rate of roll gyroscope 5, generator 22 and (when the aircraft is not banked) pendulum 7. During a turn in azimuth, the circuit operates in the same manner as that of Figure 1 operates. During level flight the signal from the monitor 7 is also integrated by device 73. The servo system operates to maintain the output from device 73 substantially zero. This implies that the long term time average of the input to the device (which is the time integral of the input divided by the time) is zero, despite possible intermittent saturation of the amplifier etc.

A suitable rate-of-turn gyroscope for use as gyroscope 5 is illustrated diagrammatically in Figure 3. As thus shown a gyroscope comprises a rotor 34 mounted on spin axis 35 in a gimbal ring 36 gimballed about an axis 37 on a fixed base 38. Carried by the gimbal ring 36 is a potentiometer contact 39 arranged to sweep across a fixed arcuate potentiometer resistance 40 as the ring rotates relatively to the base about the axis 37. The ring 36 is restrained by a spring 41 to a central position in which the contact 39 engages the mid point 42 of the resistance 40. The resistance 40 is connected across the A. C. source 43. The electrical output of the gyroscope appears between the contact 39 and the mid point 42.

In operation any turn about an axis normal to the base 38 results in precession of the gyroscope about the axis 37 against the spring restraint to an extent determined by the rate of turn. Hence the output voltage will be proportional to the rate of turn.

As an alternative to the use of a gyroscope in the arrangement described with reference to Figure 1, the rate-of-turn device described in the specification of U. S. Patent 2,455,939 may be used.

The pendulum or cross-level monitor 7 comprises an arm 44 of suitable conductive material carrying a bob and pivoted to swing about an axis parallel to the roll axis. The arm 44 sweeps across an arcuate resistance 45 connected to the A. C. source 43 so that the electrical output appears between the arm 44 and mid point 46 of resistance 45.

I claim:

1. A follow-up control system comprising a controlling object, a controlled object, means for generating signals proportional to the rates of change of the condition of the controlling object and the controlled object respectively, a motor, means for controlling the speed of said motor by the difference of said rate of change signals, means for giving a signal in accordance with the displacement of the rotor of said motor from a datum position, and means for exercising a control on the controlled object in accordance with the displacement signal and the difference of the rate of change signals.

2. A follow-up control system comprising a controlling object, a controlled object, means for generating electric signals proportional to the rates of change of the condition of the controlling object and the controlled object respectively, an electric motor, the speed thereof being substantially proportional to the voltage applied thereto, means for applying the difference of the rate of change signals to said motor, an electric pick-off device coupled to the rotor of said motor generating an electric signal in accordance with the displacement of said rotor from a datum position and means for controlling the controlled object in accordance with the resulting displacement signal and the difference of the rate of change signals.

3. An automatic control system for maintaining an aircraft in a datum position about one of the control axes thereof comprising means for generating first and second electric signals respectively in accordance with the rate of change of the position of the aircraft about said axis and the rate of change of the position of the appropriate control surface of the aircraft relative to the aircraft, means for generating a third electric signal in accordance with the displacement of the aircraft from a datum position about said axis, an electric motor, the rotor thereof being coupled to an electric pick-off device whereby a fourth electric signal is generated substantially proportional to the displacement of the rotor from a datum position, means for applying to the said motor said third signal and the difference of said first and second signals, means for controlling an electric servomotor controlling the said control surface of the aircraft by the signal from said pick-off device and the difference of the first and second signals and means for rendering inoperative during a turn of the aircraft in azimuth the means for generating the third signal.

4. A follow-up control system for controlling a condition of a controlled object in accordance with a condition of a controlling object comprising means for generating first and second signals respectively proportional to the rates of change of the condition of the controlling object and the controlled object, a monitor signal generator giving a third signal proportional to the change in the condition of the controlling object, integrating means giving a fourth signal in accordance with the integral of the difference between the first and second signals added to the third signal and means for exercising a control on the controlled object in accordance with the difference between said first and second signals added to said third and fourth signals.

5. A follow-up control system for controlling a condition of a controlled object in accordance with a condition of a controlling object comprising means for generating electric first and second signals respectively proportional to the rates of change of condition of the controlling object and the controlled object, a monitor signal generator giving a third electric signal proportional to the change in the condition of the controlling object, an electric motor, means to apply the difference between the first and second signals added to the third signal as an input signal to the electric motor, the said motor being such as to run at a speed proportional to said input signal, an electric pick-off driven by said motor to give a fourth electric signal proportional to the integral with respect to time of the input signal, an electric servo motor to control the condition of the controlled object and an electric amplifier the input to which consists of the difference between the first and second signals added to the third and fourth signals and the output of which is supplied to the servo motor.

6. An automatic control system for maintaining an aircraft in a datum position about one of the control axes thereof comprising means for generating first and second electric signals respectively in accordance with the rate of change of the position of the aircraft about said axis and the rate of change of position of the appropriate control surface relative to the aircraft, means for generating a third electric signal in accordance with displacement of the aircraft about said axis from the datum position, an electric integrator, means to apply the difference between the first and second signals added to the third signal as an input signal to the integrator, an electrically controlled servo motor actuating the appropriate control surface, the input to which motor consists of the difference between the first and second signals added to the third signal and the output signal from the integrator.

7. An automatic control system according to claim 6 wherein the integrator comprises an electric motor and pick-off, the motor being such as to run at a speed proportional to the input signal and the pick-off being driven by said motor to give an electric signal proportional to the integral with respect to time of the input signal, the said signal comprising the output signal from the integrator.

8. An automatic control system for controlling an aircraft about the roll axis comprising means for generating electric signals in accordance with the rate of roll of the aircraft and the rate of movement of the ailerons relative to the aircraft, means for generating an electric monitor signal in accordance with displacement of the aircraft about the roll axis, an electric integrator, means to apply the difference between the signals proportional to rate of roll of the aircraft and rate of movement of the ailerons as an input signal to the integrator, an electrically controlled servo-motor controlling the ailerons, the input to which motor consists of the difference between the rate of change signals and, in straight flight, the monitor signal, or, while the aircraft is banked, the output signal from the integrator.

9. An automatic control system according to claim 8 wherein the integrator comprises an electric motor and pick-off, the motor being such as to run at a speed proportional to the input signal and the pick-off being driven by said motor to give an electric signal proportional to the integral with respect to time of the input signal.

10. An automatic control system for controlling an aircraft about the roll axis comprising means for generating first and second electric signals respectively in accordance with the rate of roll of the aircraft and the rate of movement of the ailerons relative to the aircraft, means for generating a third electric signal in accordance with displacement of the aircraft about the roll axis from the datum position, an electric integrator, means to apply the difference between the first and second signals added to the third signal as an input to the integrator, an electrically-controlled servo-motor controlling the ailerons, the input to which motor consists of the difference between the first and second signals added to the third signal and the output signal from the integrator, and means to cut out the third signal when the aircraft is executing a banked turn in azimuth.

11. An automatic control system according to claim 10 wherein the integrator comprises an electric motor and pick-off, the motor being such as to run at a speed proportional to the input signal and the pick-off being driven by said motor to give an electric signal proportional to the integral with respect to time of the input signal, the said signal comprising the output signal from the integrator.

References Cited in the file of this patent
UNITED STATES PATENTS

| | | |
|---|---|---|
| 1,703,280 | Minorsky | Feb. 26, 1929 |
| 1,717,191 | Cremer | June 11, 1929 |
| 2,126,910 | Moseley | Aug. 16, 1938 |
| 2,401,421 | Hahn | June 4, 1946 |
| 2,414,430 | Nisbet | Jan. 14, 1947 |
| 2,462,095 | Halpert et al. | Feb. 22, 1949 |
| 2,503,346 | Meredith | Apr. 11, 1950 |